United States Patent
Fujii et al.

(10) Patent No.: US 9,509,226 B2
(45) Date of Patent: Nov. 29, 2016

(54) POWER GENERATING DEVICE, CONTROL DEVICE, CONTROLLING METHOD AND POWER GENERATION SYSTEM

(71) Applicant: KABUSHIKI KAISHA YASKAWA DENKI, Kitakyushu-shi (JP)

(72) Inventors: Junji Fujii, Kitakyushu (JP); Takashi Tanaka, Kitakyushu (JP); Kotaro Takeda, Kitakyushu (JP); Wataru Yoshinaga, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 130 days.

(21) Appl. No.: 14/645,426

(22) Filed: Mar. 12, 2015

(65) Prior Publication Data

US 2015/0280599 A1    Oct. 1, 2015

(30) Foreign Application Priority Data

Mar. 27, 2014 (JP) .................................. 2014-065642

(51) Int. Cl.

| | | |
|---|---|---|
| *F03D 9/00* | (2016.01) | |
| *H02P 9/04* | (2006.01) | |
| *H02M 5/297* | (2006.01) | |
| *H02M 1/00* | (2006.01) | |
| *H02M 5/06* | (2006.01) | |
| *G05F 1/00* | (2006.01) | |
| *H02M 5/45* | (2006.01) | |
| *H02M 5/293* | (2006.01) | |

(52) U.S. Cl.
CPC .............. *H02M 5/297* (2013.01); *F03D 9/003* (2013.01); *H02M 1/00* (2013.01); *H02M 5/06* (2013.01); *H02M 2001/0083* (2013.01); *H02M 2005/2932* (2013.01)

(58) Field of Classification Search
USPC ................. 290/44, 55; 323/282; 363/37, 123
See application file for complete search history.

(56) References Cited

U.S. PATENT DOCUMENTS

| | | | | |
|---|---|---|---|---|
| 6,900,998 | B2* | 5/2005 | Erickson | H02M 5/297 290/44 |
| 7,599,196 | B2* | 10/2009 | Alexander | H02M 3/1582 363/124 |
| 7,778,045 | B2* | 8/2010 | Alexander | H02M 3/1582 363/124 |
| 7,848,121 | B2* | 12/2010 | Kojori | H02M 1/32 363/37 |
| 8,300,426 | B2* | 10/2012 | Alexander | H02M 3/1582 363/124 |
| 8,345,452 | B2* | 1/2013 | Alexander | H02M 3/1582 363/124 |
| 8,351,224 | B2* | 1/2013 | Ohashi | H02M 5/271 363/34 |
| 8,395,910 | B2* | 3/2013 | Alexander | H02M 3/1582 363/142 |

(Continued)

FOREIGN PATENT DOCUMENTS

| | | |
|---|---|---|
| EP | 2677168 | 12/2013 |
| JP | 2010-093868 | 4/2010 |

(Continued)

OTHER PUBLICATIONS

Extended European Search Report for corresponding EP Application No. 15158155.0-1809, Aug. 4, 2015.

*Primary Examiner* — Pedro J Cuevas
(74) *Attorney, Agent, or Firm* — Mori & Ward, LLP (57) ABSTRACT

A power generating device is provided, which includes a matrix converter device, a power transmission path for transmitting electric power between the matrix converter device and an electric power system, and at least one inductor for phase adjustment, bridged between the power transmission path and a neutral point.

10 Claims, 9 Drawing Sheets

(56) References Cited

U.S. PATENT DOCUMENTS

| | | | |
|---|---|---|---|
| 8,400,800 B2* | 3/2013 | Alexander | H02M 3/1582 363/123 |
| 9,130,461 B2* | 9/2015 | Alexander | H02M 3/1582 |
| 9,318,992 B2* | 4/2016 | Swamy | H02P 27/16 |
| 2008/0013351 A1* | 1/2008 | Alexander | H02M 3/1582 363/123 |
| 2008/0031019 A1* | 2/2008 | Alexander | H02M 3/1582 363/37 |
| 2008/0285314 A1* | 11/2008 | Kojori | H02M 1/32 363/37 |
| 2010/0067264 A1* | 3/2010 | Ohashi | H02M 5/4585 363/37 |
| 2010/0067272 A1* | 3/2010 | Alexander | H02M 3/1582 363/123 |
| 2011/0012579 A1* | 1/2011 | Huang | H02M 1/4208 323/304 |
| 2012/0008353 A1* | 1/2012 | Alexander | H02M 3/1582 363/123 |
| 2012/0020129 A1* | 1/2012 | Alexander | H02M 3/1582 363/123 |
| 2012/0033464 A1* | 2/2012 | Alexander | H02M 3/1582 363/37 |
| 2012/0051100 A1* | 3/2012 | Alexander | H02M 3/1582 363/37 |
| 2012/0275202 A1* | 11/2012 | Yamamoto | H02M 1/32 363/71 |
| 2013/0328309 A1* | 12/2013 | Fujii | F03D 7/0272 290/44 |
| 2014/0029320 A1* | 1/2014 | Alexander | H02M 5/225 363/123 |
| 2014/0117917 A1* | 5/2014 | Takeda | H02P 27/16 318/519 |
| 2014/0133203 A1* | 5/2014 | Alexander | H02M 3/1582 363/124 |
| 2014/0160824 A1* | 6/2014 | Inomata | H02M 5/297 363/150 |
| 2014/0176100 A1* | 6/2014 | Hara | H02M 5/293 323/282 |
| 2014/0268970 A1* | 9/2014 | Tanaka | H02M 5/297 363/163 |
| 2015/0001847 A1* | 1/2015 | Oba | H05K 7/2089 290/44 |
| 2015/0054443 A1* | 2/2015 | Swamy | H02P 27/16 318/504 |
| 2015/0188443 A1* | 7/2015 | Takeda | F03D 9/003 416/146 R |
| 2015/0280597 A1* | 10/2015 | Takase | H02M 1/12 323/271 |
| 2015/0295506 A1* | 10/2015 | Inomata | H02M 5/271 323/282 |
| 2016/0006389 A1* | 1/2016 | Takeda | H02M 1/126 318/400.26 |
| 2016/0072400 A1* | 3/2016 | Alexander | H02M 3/1582 363/35 |
| 2016/0079905 A1* | 3/2016 | Swamy | H02P 27/16 318/806 |

FOREIGN PATENT DOCUMENTS

| WO | WO 2004/042890 | 5/2004 |
|---|---|---|
| WO | WO 2012/111115 | 8/2012 |

* cited by examiner

POWER GENERATING DEVICE, CONTROL DEVICE, CONTROLLING METHOD AND POWER GENERATION SYSTEM

CROSS-REFERENCE TO RELATED APPLICATION(S)

The application claims priority under 35 U.S.C. §119 to Japanese Patent Application No. 2014-065642, which was filed on Mar. 27, 2014, the entire disclosure of which is hereby incorporated by reference.

TECHNICAL FIELD

The present disclosure relates to a power generating device, a control device, a controlling method, and a power generation system.

BACKGROUND

Power generating devices provided with a power generation element and a power converter are widely used. The power converter converts power between the power generation element and an electric power system. WO2012/111115A1 discloses a power generating device which uses a matrix converter as the power converter.

SUMMARY

According to one aspect of the present disclosure, a power generating device is provided, which includes a matrix converter device, a power transmission path for transmitting electric power between the matrix converter device and an electric power system, and at least one inductor for phase adjustment, bridged between the power transmission path and a neutral point.

According to another aspect of the present disclosure, a control device for controlling the power generating device is provided. The control device includes a power generation controlling module for controlling the matrix converter device to perform power conversion between a power generation element and the electric power system, and a phase adjustment switching module for controlling the switch to change the path for phase adjustment into the cut-off state in response to an increase in power generation, and to change the path for phase adjustment into the conducting state in response to a decrease in the power generation.

According to another aspect of the present disclosure, a method of controlling the power generating device is provided. The method includes controlling the matrix converter device to perform power conversion between a power generation element and the electric power system, and controlling the switch to change the path for phase adjustment into the cut-off state in response to an increase in power generation, and to change the path for phase adjustment into the conducting state in response to a decrease in the power generation.

According to another aspect of the present disclosure, a power generation system is provided, which includes a matrix converter device, an inductor for phase adjustment, bridged between a power transmission path connecting the matrix converter device with an electric power system, and a neutral point. The system also includes a switch provided in series to the inductor for phase adjustment, between the power transmission path and the neutral point, and for switching a path for phase adjustment including the inductor for phase adjustment between a conducting state and a cut-off state. The system also includes a power generation controlling module for controlling the matrix converter to perform power conversion between a power generation element and the electric power system, and a phase adjustment switching module for controlling the switch to change the path for phase adjustment into the cut-off state in response to an increase in power generation, and to change the path for phase adjustment into the conducting state in response to a decrease in the power generation.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Hereinafter, one embodiment is described in detail with reference to the accompanying drawings. In this description, same reference numerals are given to same elements or elements having same functions, and redundant explanation is omitted.

[Power Generation System]

Figure 1:
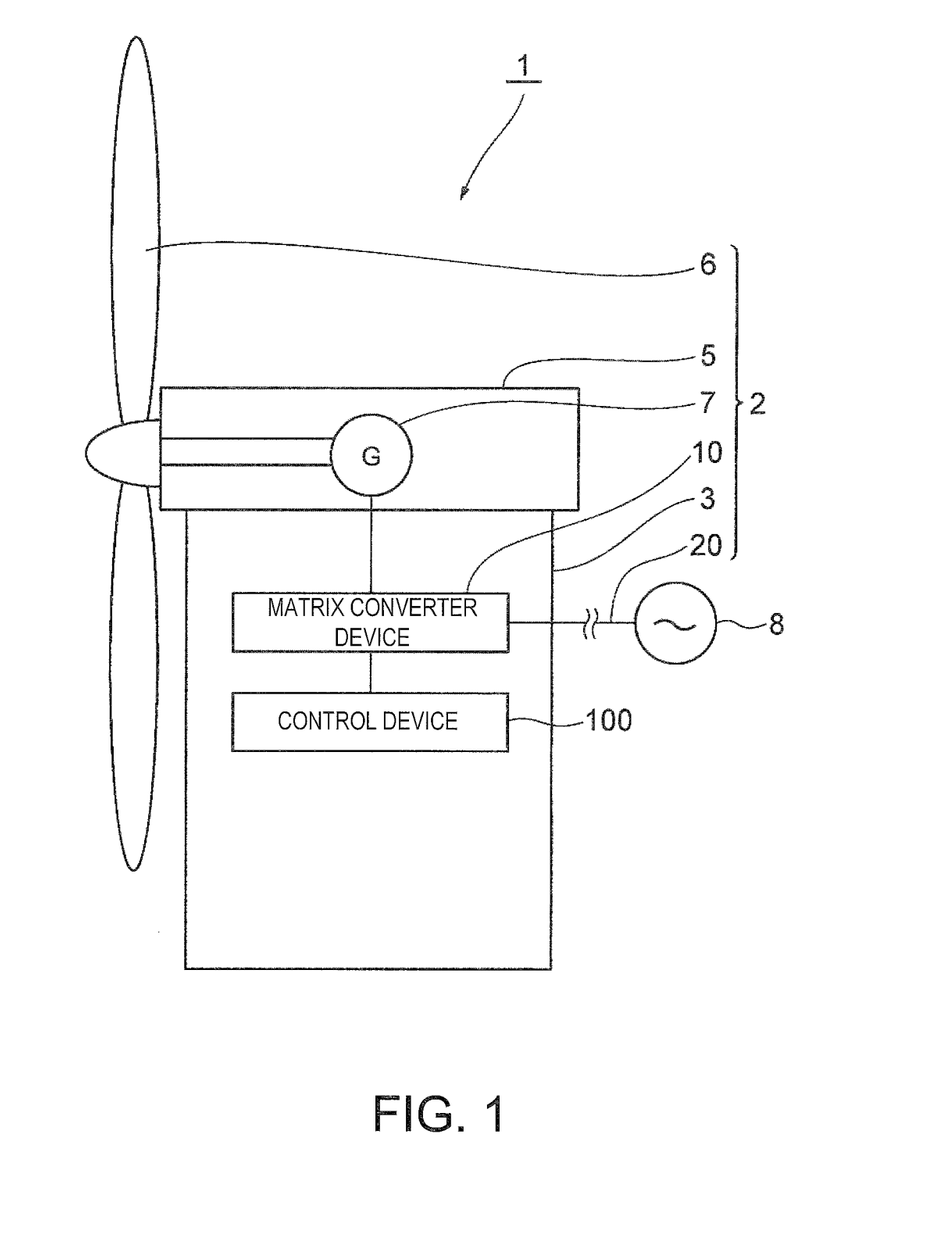
FIG. 1 is a schematic diagram illustrating an outline configuration of a wind power generating device.

As illustrated in FIG. 1, a power generation system 1 includes a power generating device 2 and a control device 100. The power generating device 2 is a wind power generating device, and includes a tower body 3, a nacelle 5, a set of blades 6, a power generator 7, and a matrix converter device 10. Note that the power generating device 2 may not be limited to the wind power generating device, but may be, for example, a solar power generating device. Note that the matrix converter device is one example of a power converter.

The tower body 3 supports the nacelle 5, and accommodates the matrix converter device 10, a power transmission path 20, and the control device 100. The nacelle 5 accommodates the power generator 7. The blades 6 are rotatably provided outside the nacelle 5, and rotate by wind force. The power generator 7 (power generation element) is, for example, a synchronous generator or an induction generator. The power generator 7 is driven by the rotation of the blades 6 to produce three-phase alternating current (AC) power of R-phase, S-phase and T-phase. That is, the power generator 7 is a wind-force power generator that is driven by wind force.

Figure 2:
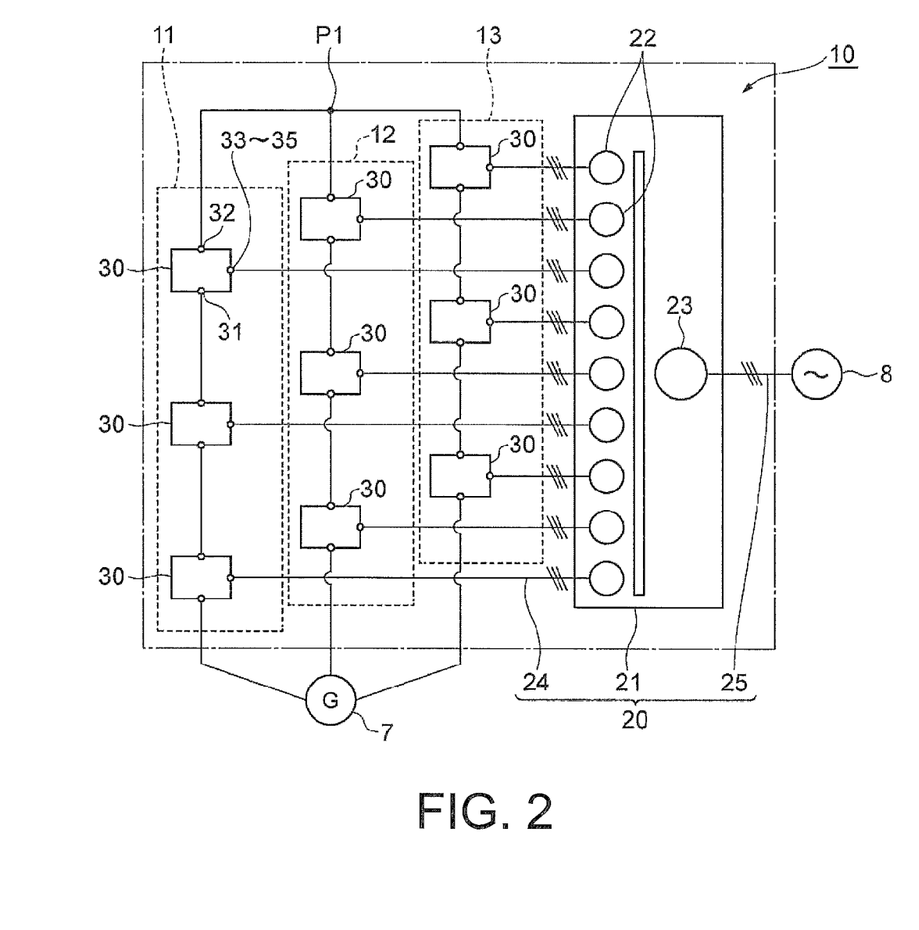
FIG. 2 is a schematic diagram illustrating an outline configuration of a matrix converter device of FIG. 1.

The matrix converter device 10 converts output power of the power generator 7 according to an electric power system 8. As illustrated in FIG. 2, the matrix converter device 10 has an R-phase unit 11, an S-phase unit 12 and a T-phase unit 13. The R-phase unit 11 is provided between the R-phase of the power generator 7 and a neutral point P1. The S-phase unit 12 is provided between the S-phase of the power generator 7 and the neutral point P1. The T-phase unit 13 is provided between the T-phase of the power generator 7 and the neutral point P1.

The R-phase unit 11, the S-phase unit 12 and the T-phase unit 13 have three matrix converters 30, respectively (nine converters in total). The three matrix converters 30 of the R-phase unit 11 are bridged between the R-phase of the power generator 7 and the neutral point P1 in a state where the matrix converters 30 are mutually connected in series. That is, one end of the three matrix converters 30 connected in series is connected with the R-phase of the power generator 7, and the other end is connected with the neutral point P1. The three matrix converters 30 of the S-phase unit 12 are bridged between the S-phase of the power generator 7 and the neutral point P1 in a state where the converters 30 are mutually connected in series. The three matrix converters 30 of the T-phase unit 13 are bridged between the T-phase of the power generator 7 and the neutral point P1 in a state where the converters 30 are mutually connected in series.

The power transmission path 20 includes a main transformer 21, first power lines 24, and a second power line 25, and transmits electric power between the matrix converters 30 and the electric power system 8. The main transformer 21 is a three-phase transformer. The first power lines 24 connect terminals 33, 34 and 35 of the matrix converters 30 with the main transformer 21. The second power line 25 connects the electric power system 8 with the main transformer 21. The main transformer 21 includes first coils 22 connected with the first power lines 24, and a second coil 23 connected with the second power line 25. The main transformer 21 is configured so that the electric power system 8 side is a high-voltage side.

Figure 3:
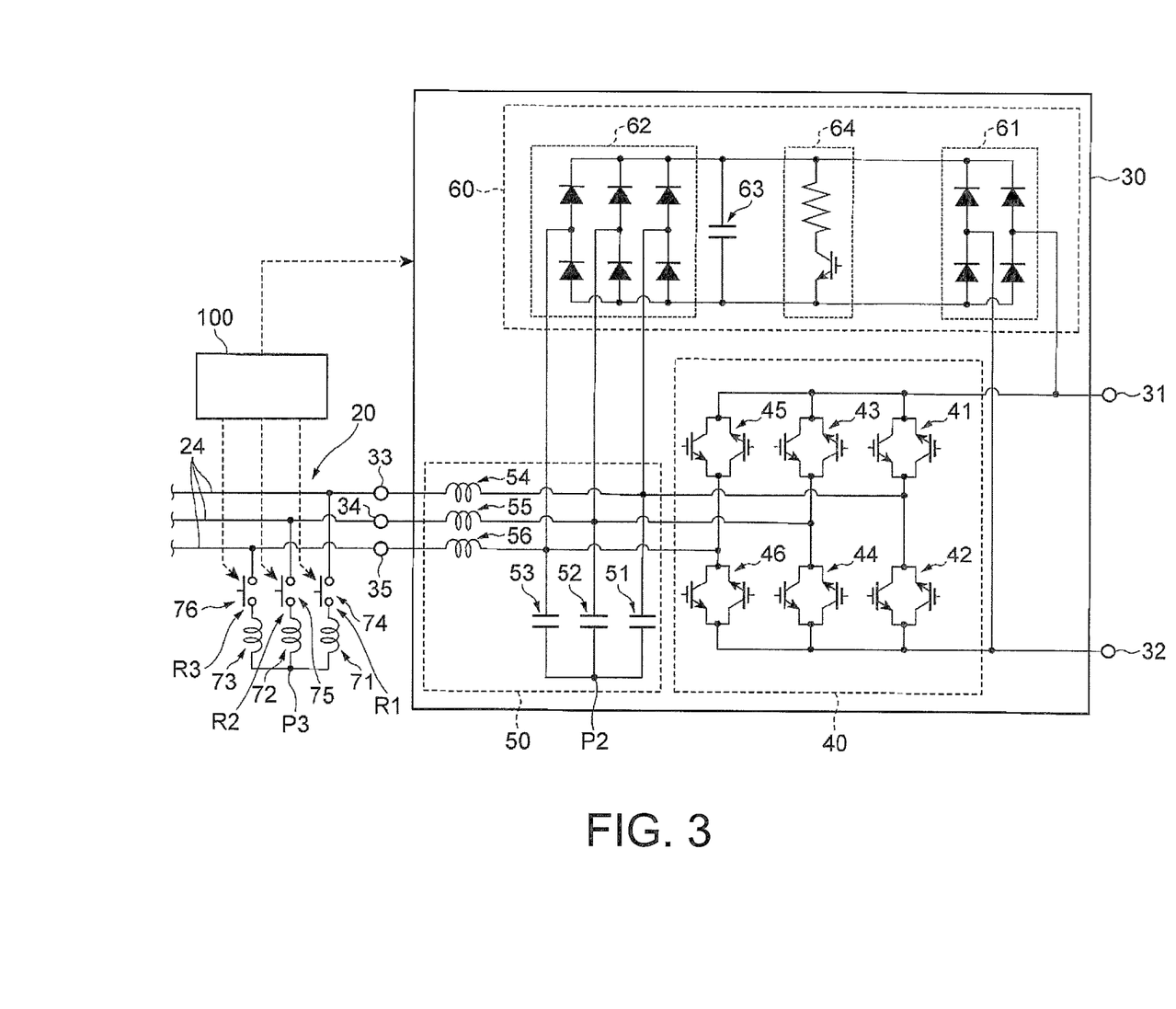
FIG. 3 is a schematic diagram illustrating an outline configuration of a matrix converter of FIG. 2.

As illustrated in FIG. 3, each matrix converter 30 includes a converter main body 40, a filter 50, a snubber circuit 60, and the terminals 31-35. The converter main body 40 has bidirectional switches 41-46.

The bidirectional switches 41 and 42 are bridged between the terminal 31 and the terminal 32 in a state where the switches 41 and 42 are mutually connected in series. The connection between the bidirectional switches 41 and 42 is connected with the terminal 33 via the filter 50.

The bidirectional switches 43 and 44 are also bridged between the terminal 31 and the terminal 32 in a state where the switches 43 and 44 are mutually connected in series. The connection between the bidirectional switches 43 and 44 is connected with the terminal 34 via the filter 50.

The bidirectional switches 45 and 46 are also bridged between the terminal 31 and the terminal 32 in a state where the switches 45 and 46 are mutually connected in series. The connection between the bidirectional switches 45 and 46 is connected with the terminal 35 via the filter 50.

Each of the bidirectional switches 41-46 is comprised of, for example, two switching elements which are mutually connected in parallel and in opposite directions. The switching element may include, for example, a semiconductor switch, such as an IGBT (Insulated Gate Bipolar Transistor). Power conversion is performed between the terminals 31 and 32 and the terminals 33, 34 and 35 by switching of the bidirectional switches 41-46 (ON/OFF switching of the switching elements).

The filter 50 includes capacitors 51, 52 and 53, and inductors 54, 55 and 56. The capacitor 51 intervenes between the connection between the bidirectional switches 41 and 42, and a neutral point P2. The capacitor 52 intervenes between the connection between the bidirectional switches 43 and 44, and the neutral point P2. The capacitor 53 intervenes between the connection between the bidirectional switches 45 and 46, and the neutral point P2. The inductor 54 intervenes between the connection of the bidirectional switches 41 and 42, and the terminal 33. The inductor 55 intervenes between the connection of the bidirectional switches 43 and 44, and the terminal 34. The inductor 56 intervenes between the connection of the bidirectional switches 45 and 46, and the terminal 35.

The snubber circuit 60 includes rectification circuits 61 and 62, a capacitor 63, and a discharge circuit 64. The rectification circuits 61 and 62 convert surge current produced between the terminals of the converter main body 40 into direct current, and accumulate the direct current in the capacitor 63. The discharge circuit 64 discharges the electric charge accumulated in the capacitor 63, according to an electric discharge instruction. The discharge circuit 64 is comprised of, for example, a switching element such as an IGBT, and a resistor.

The terminal 31 of the matrix converter 30 located closest to the power generator 7 is connected with the power generator 7, and the terminals 31 of other matrix converters 30 are connected with adjacent matrix converters 30 on the power generator 7 side (refer to FIG. 2). The terminal 32 of the matrix converter 30 located closest to the neutral point P1 is connected with the neutral point P1, and the terminals 32 of other matrix converters 30 are connected with adjacent matrix converters 30 on the neutral point P1 side. The terminals 33, 34 and 35 are connected with the first coils 22 of the main transformer 21 through the first power lines 24.

An inductor 71 for phase adjustment is bridged between the first power line 24 that connects the terminal 33 with the first coil 22, and a neutral point P3. An inductor 72 for phase adjustment is bridged between the first power line 24 that connects the terminal 34 with the first coil 22, and the neutral point P3. An inductor 73 for phase adjustment is bridged between the first power line 24 that connects the terminal 35 with the first coil 22, and the neutral point P3. That is, the power generating device 2 includes the inductors 71, 72 and 73 for phase adjustment which are bridged between the power transmission path 20 and the neutral point P3. The inductors 71, 72 and 73 are provided for each matrix converter 30, and are bridged between the first power lines 24 and the neutral point P3.

The power generating device 2 further includes switches 74, 75 and 76. The switch 74 is provided between the first power line 24 and the neutral point P3, in series to the inductor 71. The switch 74 closes and opens to switch a path R1 including the inductor 71 (path for phase adjustment) between a conducting state and a cut-off state, respectively. The switch 75 is provided between the first power line 24 and the neutral point P3, in series to the inductor 72. The switch 75 closes and opens to switch a path R2 including the inductor 72 (path for phase adjustment) between a conducting state and a cut-off state, respectively. The switch 76 is provided between the first power line 24 and the neutral point P3, in series to the inductor 73. The switch 76 closes and opens to switch a path R3 including the inductor 73 (path for phase adjustment) between a conducting state and a cut-off state, respectively.

[Control Device]

Figure 4:
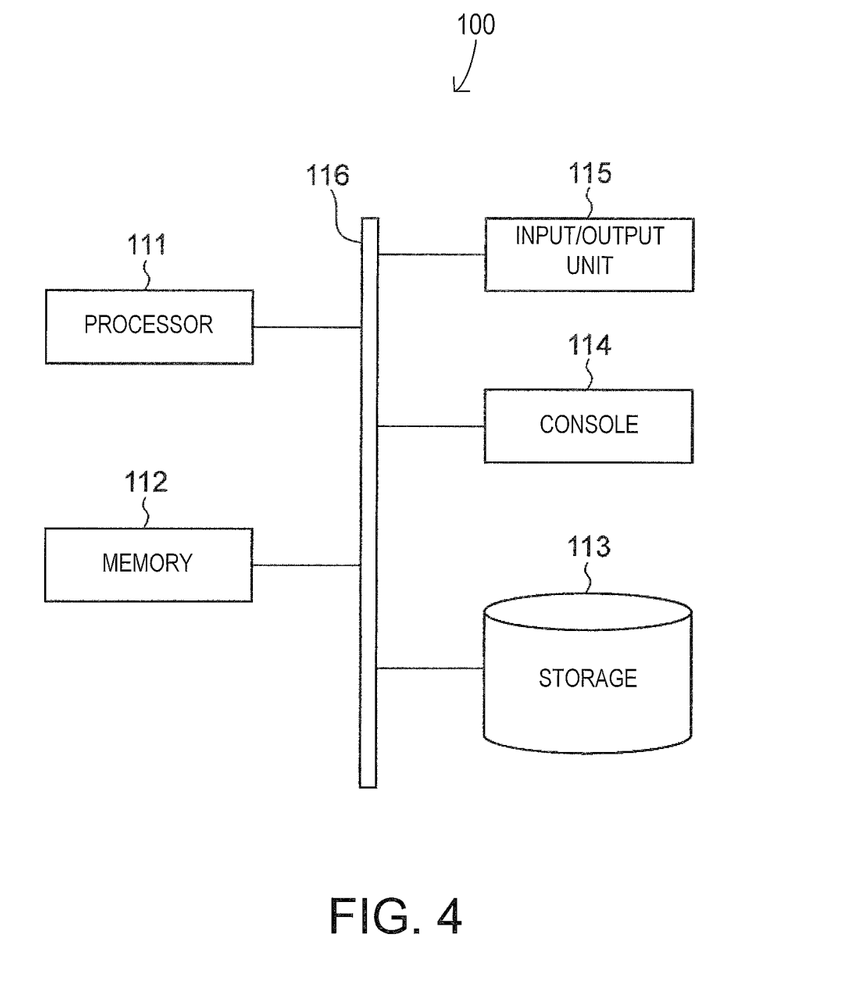
FIG. 4 is a block diagram illustrating a hardware configuration of a control device of FIG. 1.

The control device 100 is comprised of, for example, one or more computers, and as illustrated in a hardware configuration of FIG. 4, it includes a processor 111, a memory 112, a storage 113, a console 114, an input/output (I/O) unit 115, and a bus 116 that connects these components. The processor 111 collaborates with at least either one of the memory 112 and the storage 113, to execute a program temporarily stored in the memory 112 or stored in the storage 113, and performs output and input of data through at least either one of the console 114 and the input/output unit 115, according to the executed result. Thus, various functions of the control device 100 are realized. Note that the program may be provided to the system in advance, or may be provided from outside of the system by a storage medium or through a communication line.

Figure 5:
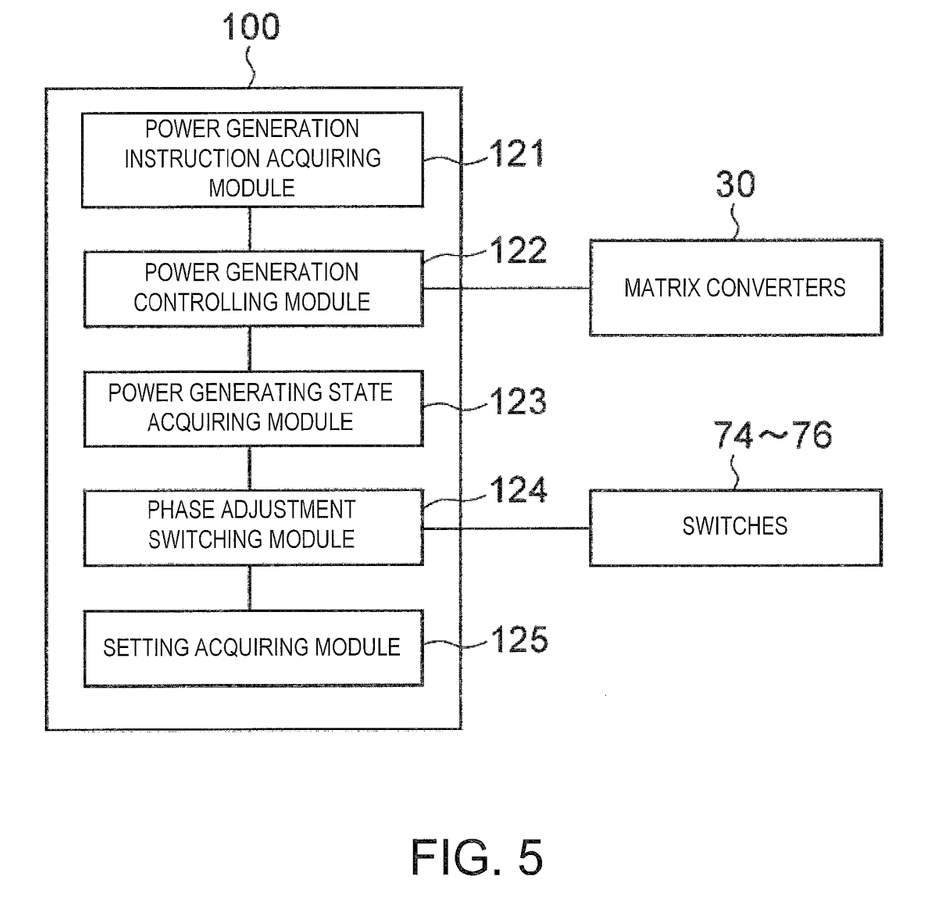
FIG. 5 is a block diagram illustrating a functional configuration of the control device of FIG. 1.

FIG. 5 illustrates the functions realized by the control device 100 as imagination components (hereinafter, referred to as "functional blocks"). These functional blocks are merely formed by conveniently dividing the function of the control device 100 into two or more blocks, and do not mean that the hardware which constitutes the control device 100 is actually divided into such blocks. Moreover, each functional block is not necessarily realized by execution of the program, but may be realized by a circuit element dedicated to a predetermined operation (for example, a logic IC). The control device 100 may also be provided as hardware that is integrally formed with the matrix converter device 10.

As illustrated in FIG. 5, the control device 100 includes, as the functional blocks, a power generation instruction acquiring module 121, a power generation controlling module 122, a power generating state acquiring module 123, a phase adjustment switching module 124, and a setting acquiring module 125.

The power generation instruction acquiring module 121 acquires, for example, a power generation start instruction, a power generation stop instruction, and a target value of power generation. Note that the term "power generation" refers to output power from the matrix converter device 10 to the electric power system 8. The power generation controlling module 122 controls the matrix converters 30 to perform the power conversion between the power generator 7 and the electric power system 8.

The power generating state acquiring module 123 acquires information indicative of the power generation from the power generation controlling module 122. The information acquired by the power generating state acquiring module 123 may be any kind of information as long as it is information indicative of an increase or a decrease of the power generation, and the information may be, for example, a wind velocity near the blades 6, a rotating speed of the blades 6 (or the power generator 7), or output power of the power generator 7.

The phase adjustment switching module 124 controls the switches 74, 75 and 76 to change the paths R1, R2 and R3 into the cut-off state in response to an increase of the power generation, and to change the paths R1, R2 and R3 into the conducting state in response to a decrease of the power generation. For example, the phase adjustment switching module 124 changes the paths R1, R2 and R3 into the cut-off state when the value acquired by the power generating state acquiring module 123 exceeds a threshold, and it changes the paths R1, R2 and R3 into the conducting state when the value acquired by the power generating state acquiring module 123 does not exceed the threshold.

The setting acquiring module 125 acquires settings for the phase adjustment switching module 124. For example, the setting acquiring module 125 acquires settings of whether the paths R1, R2 and R3 are always maintained in the conducting state, or whether the change between the conducting state and the cut-off state is to be performed according to the power generation.

[Controlling Method]

Figure 6:
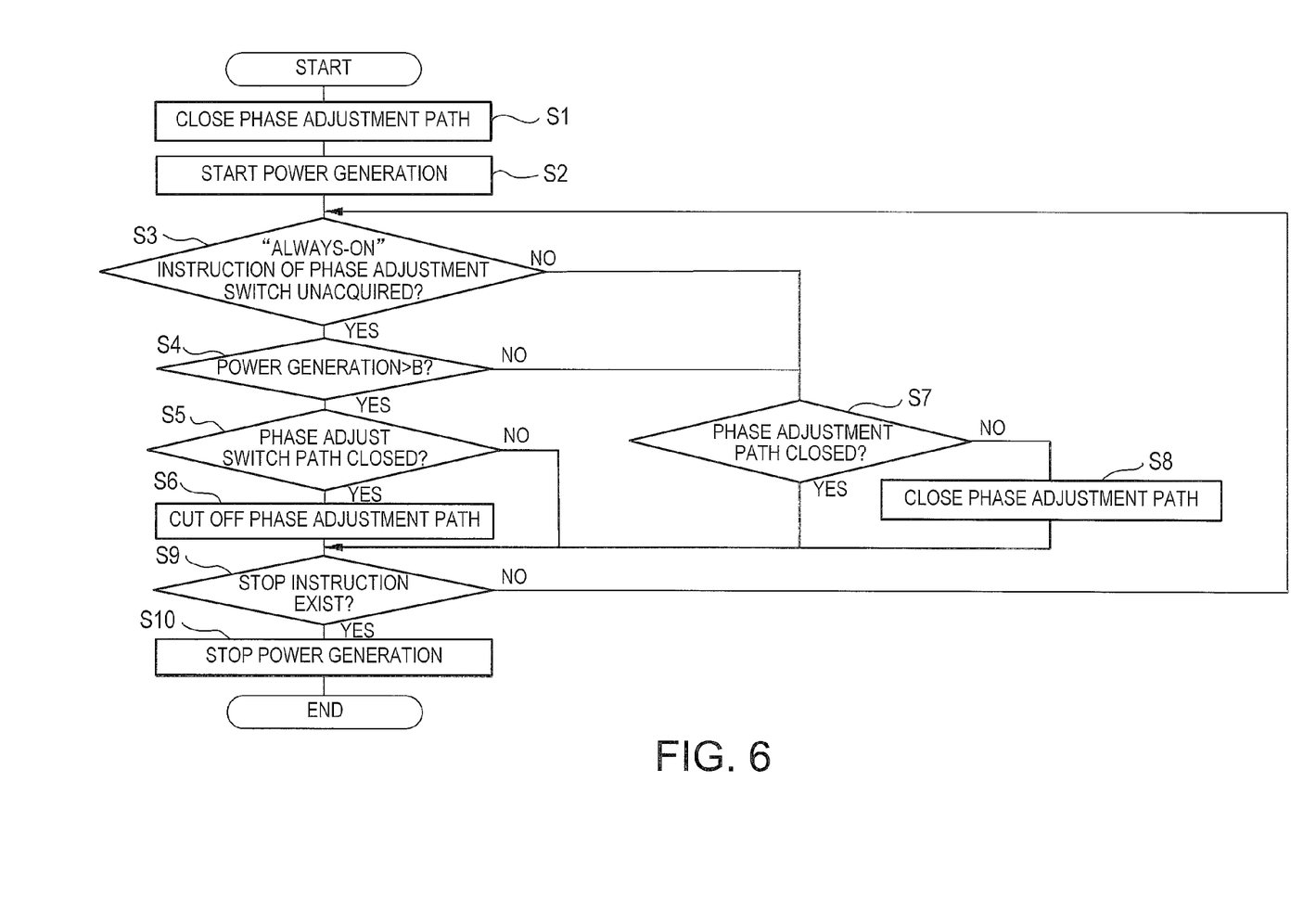
FIG. 6 is a flowchart illustrating a procedure of a controlling method.

The control device 100 performs the controlling method as described below. As illustrated in FIG. 6, the control device 100 controls the switches 74, 75 and 76 in response to the acquisition of the power generation start instruction by the power generation instruction acquiring module 121 so that the paths R1, R2 and R3 are changed into the conducting state (Step S1). That is, the control device 100 performs a control to close the switches 74, 75 and 76 by the phase adjustment switching module 124.

Next, the control device 100 starts controlling the matrix converters 30 so that the power conversion is performed between the power generator 7 and the electric power system 8 (Step S2). The control device 100 controls the matrix converters 30 by the power generation controlling module 122. The power generation controlling module 122 controls the matrix converters 30 so that an actual power generation approaches the target value acquired by the power generation instruction acquiring module 121.

Next, the control device 100 checks the settings acquired by the setting acquiring module 125 (Step S3). If the settings to perform the switching between the conducting state and the cut-off state according to the power generation are confirmed, the control device 100 checks whether the power generation exceeds a predetermined threshold B (Step S4).

If it is confirmed that the power generation exceeds the threshold B, the control device 100 checks whether the paths R1, R2 and R3 are in the conducting state (Step S5).

If it is confirmed that the paths R1, R2 and R3 are in the conducting state, the control device 100 controls the switches 74, 75 and 76 so that the paths R1, R2 and R3 are changed into the cut-off state (Step S6). That is, the control device 100 performs a control to open the switches 74, 75 and 76 by the phase adjustment switching module 124. At Step S5, if it is confirmed that the paths R1, R2 and R3 are not in the conducting state, the control device 100 does not perform Step S6.

If settings to always maintain the paths R1, R2 and R3 in the conducting state are confirmed at Step S3, or if it is confirmed that the measurement related to the power generation does not exceed the threshold B at Step S4, the control device 100 checks whether the paths R1, R2 and R3 are in the conducting state (Step S7).

If it is confirmed that the paths R1, R2 and R3 are not in the conducting state, the control device 100 controls the switches 74, 75 and 76 to change the paths R1, R2 and R3 into the conducting state (Step S8). That is, the control device 100 performs a control to close the switches 74, 75 and 76 by the phase adjustment switching module 124. At Step S7, if it is confirmed that the paths R1, R2 and R3 are in the conducting state, the control device 100 does not perform Step S8.

By Steps S6 and S8, the switches 74, 75 and 76 are controlled to change the paths R1, R2 and R3 into the cut-off state according to the increase in the power generation, and to change the path for phase adjustment into the conducting state according to the decrease in the power generation.

Next, the control device 100 checks whether the power generation stop instruction is acquired by the power generation instruction acquiring module 121 (Step S9). If it is confirmed that the power generation stop instruction is not acquired, the control device 100 returns the control procedure to Step S3. If the acquisition of the power generation stop instruction is confirmed, the control device 100 suspends the control of the matrix converters 30 by the power generation controlling module 122 (Step S10).

As described above, the filter 50 is provided on the electric power system 8 side of each matrix converter 30. Thus, the phase of current advances compared with the phase of voltage between the matrix converters 30 and the electric power system 8. Therefore, the power factor tends to be lowered. Although the power factor is possible to be raised by controlling the matrix converters 30, the power factor may not fully be raised in situations with low power generation.

According to the power generating device 2, since the inductors 71, 72 and 73 for phase adjustment are bridged between the power transmission path 20 and the neutral point P3, the advancing of the phase of current can be reduced. Thus, even if the power generation is low, the power factor can fully be raised. Therefore, the power factor can be adjusted more appropriately, while using the matrix converters 30.

The power generating device 2 includes a plurality of matrix converters 30 which are mutually connected in series. The power transmission path 20 includes the main transformer 21, the first power lines 24 which connect the matrix converters 30 with the main transformer 21, and the second power line 25 which connects the electric power system 8 with the main transformer 21. The inductors 71, 72 and 73 are provided for each matrix converter 30, and they are bridged between the first power lines 24 and the neutral point P3. Since the voltages in the first power lines 24 are lower than the voltage in the second power line 25, installation of the inductors for phase adjustment is easier than installing the inductors 71, 72 and 73 between the second power line 25 and the neutral point P3.

The power generation element of the power generating device 2 is a wind power generator. The wind power generating devices are often installed, for example, at locations where maintenance is typically difficult, such as on the sea. On the other hand, if the matrix converters 30 are used for the power conversion of the power generating device 2, the frequency of maintenance of the power generating device tends to be lowered than the case where converters and inverters are used. Therefore, the adoption of the matrix converters 30 becomes more useful by applying the power generation element to the wind power generator.

The control device 100 includes the power generation controlling module 122 for controlling the matrix converters 30 to perform the power conversion between the power generator 7 and the electric power system 8, and the phase adjustment switching module 124 for controlling the switches 74, 75 and 76 to change the paths R1, R2 and R3 into the cut-off state in response to the increase in the power generation, and to change the paths R1, R2 and R3 into the conducting state in response to the decrease in the power generation.

The controlling method by the control device 100 includes controlling the matrix converters 30 to perform the power conversion between the power generator 7 and the electric power system 8, and controlling the switches 74, 75 and 76 to change the paths R1, R2 and R3 into the cut-off state in response to the increase in the power generation, and to change the paths R1, R2 and R3 into the conducting state in response to the decrease in the power generation. Power consumption in the inductors 71, 72 and 73 can be reduced by changing the paths R1, R2 and R3 into the conducting state only when the power generation is low and the power factor is thus difficult to be raised.

[Modification of Power Generating Device]

Figure 7:
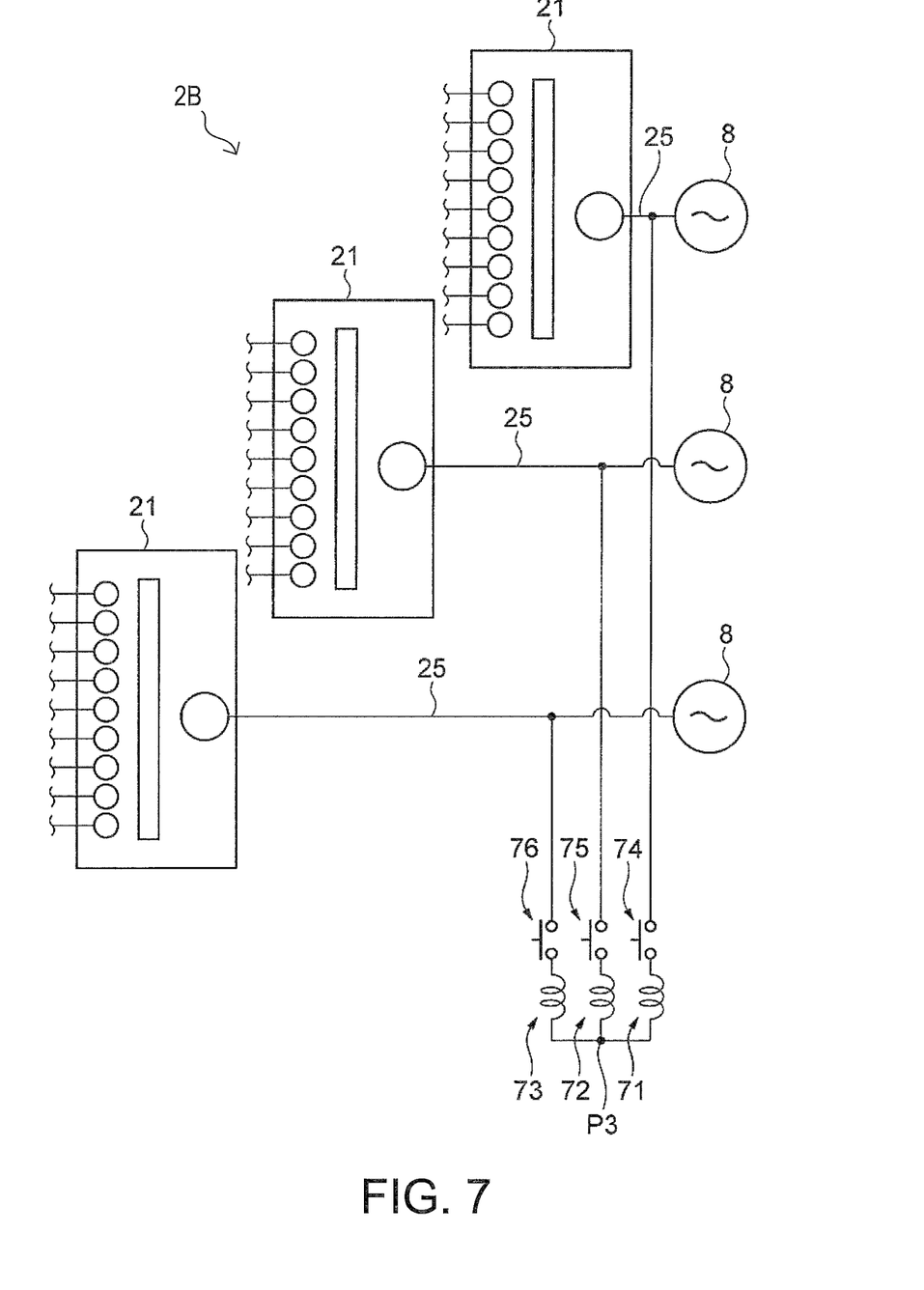
FIG. 7 is a schematic diagram illustrating a modification of the power generating device.

Note that the inductors 71, 72 and 73 may be bridged between the second power lines 25 and the neutral point P3, as illustrated in a power generating device 2B according to a modification of FIG. 7. In this case, the number of inductors 71, 72 and 73 can be reduced, compared with installing the inductors 71, 72 and 73 between the first power lines 24 and the neutral point P3.

Figure 8:
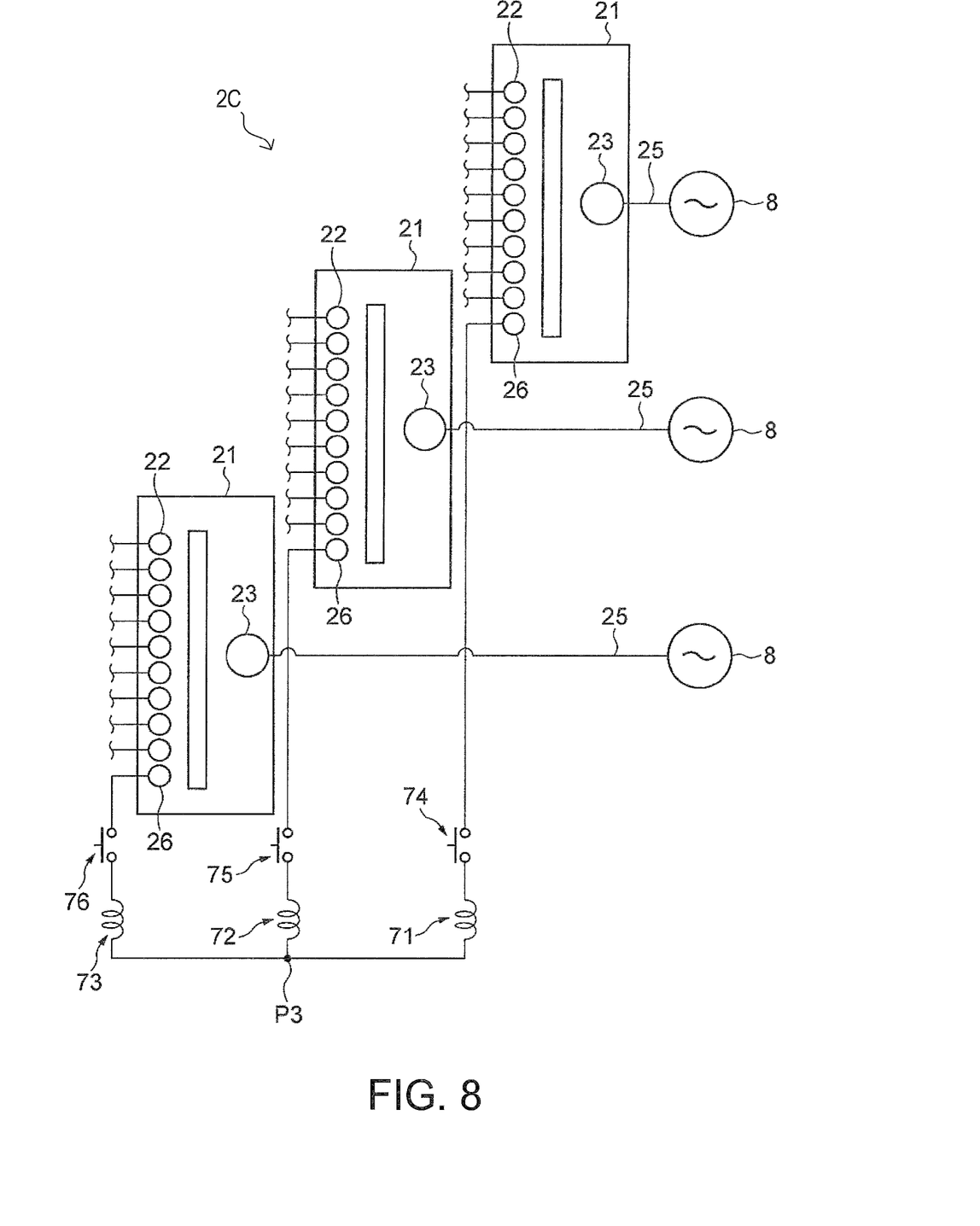
FIG. 8 is a schematic diagram illustrating another modification of the power generating device.

As illustrated in a power generating device 2C according to a modification of FIG. 8, the main transformer 21 may further include third coils 26 which are wound so as to surround magnetic fluxes passing through the first coils 22 and the second coils 23, and the inductors 71, 72 and 73 may be bridged between the third coils 26 and the neutral point P3. In this case, voltage applied to the inductors 71, 72 and 73 can be lowered, compared with installing the inductors 71, 72 and 73 between the second power lines 25 and the neutral point P3. Further, the number of inductors 71, 72 and 73 can be reduced, compared with installing the inductors 71, 72 and 73 between the first power lines 24 and the neutral point P3. Therefore, both the easiness of installing the inductors 71, 72 and 73, and the reduction in the number of inductors 71, 72 and 73 can be achieved.

Figure 9:
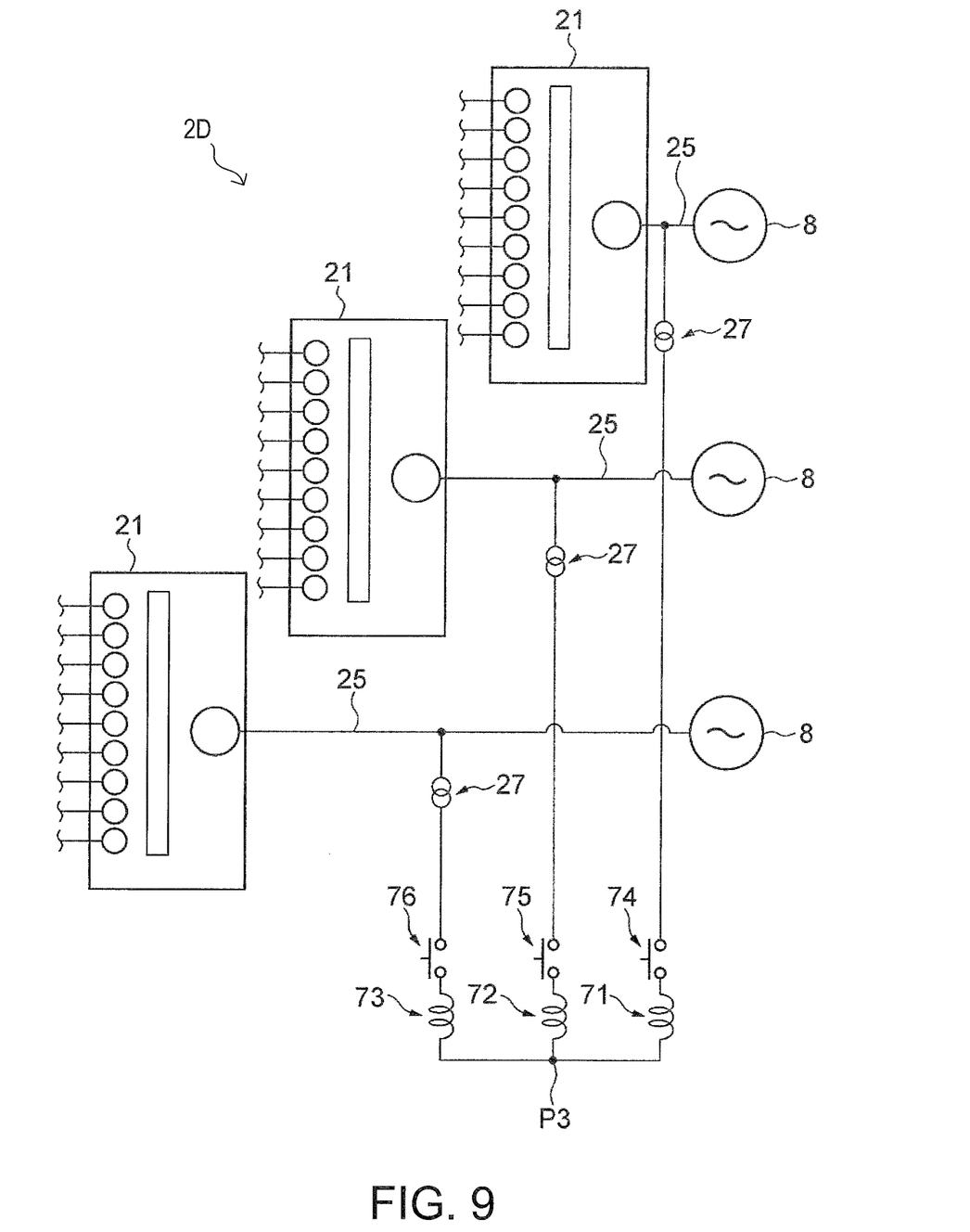
FIG. 9 is a schematic diagram illustrating still another modification of the power generating device.

The power generating device 2 may further include sub-transformers 27 which intervene between the inductors 71, 72 and 73 and the power transmission path 20. A power generating device 2D according to a modification of FIG. 9 illustrates a configuration in which the inductors 71, 72 and 73 are connected with the second power lines 25 via the sub-transformers 27. By the sub-transformers 27 being intervened, voltage applied to the inductors 71, 72 and 73 can be lowered.

Transformers for accessories (for example, a cooling pump or a cooling fan) may also be used as the sub-transformers 27. In this case, the voltage applied to the inductors 71, 72 and 73 can be lowered, without providing the sub-transformers 27 dedicated to the inductors 71, 72 and 73.

In the foregoing specification and specific embodiments of the present disclosure have been described. However, one of ordinary skill in the art appreciates that various modifications and changes can be made without departing from the scope of the present disclosure as set forth in the appended claims below. Accordingly, the specification and figures are to be regarded in an illustrative rather than a restrictive sense, and all such modifications are intended to be included within the scope of present disclosure. The benefits and advantages, solutions to problems, and any element(s) that may cause any benefit, advantage and/or solution to occur or become more pronounced are not to be construed as a critical, required and/or essential features or elements of any or all the claims. The present disclosure is defined solely by the appended claims including any amendments made during the pendency of this application and all equivalents of those claims as issued.

For example, some or all of the inductors 71, 72 and 73 for phase adjustment which are bridged between the first power lines 24 and the neutral point P3, the inductors 71, 72 and 73 which are bridged between the second power lines 25 and the neutral point P3, and the inductors 71, 72 and 73 which are bridged between the third coils 26 and the neutral point P3 may be adopted in combination. The switches 74, 75 and 76 are not essential. The power generation element of the power generating device 2 may be, for example, a solar cell, without limiting to the wind power generator.

What is claimed is:

1. A power generating device, comprising:
a matrix converter device;
a power transmission path for transmitting electric power between the matrix converter device and an electric power system; and
at least one inductor for phase adjustment, bridged between the power transmission path and a neutral point.

2. The power generating device of claim 1, wherein the matrix converter device includes a plurality of matrix converters, the matrix converters being connected with each other in series,
wherein the power transmission path includes a main transformer, first power lines connecting the matrix converters with the main transformer, and a second power line connecting the electric power system with the main transformer, and
wherein the inductor for phase adjustment is provided for each matrix converter, and is bridged between each of the first power lines and the neutral point.

3. The power generating device of claim 1, wherein the power transmission path includes a main transformer, a first power line connecting the matrix converter with the main transformer, and a second power line connecting the electric power system with the main transformer, and
wherein the inductor for phase adjustment is bridged between the second power line and the neutral point.

4. The power generating device of claim 1, wherein the power transmission path includes a main transformer, a first power line connecting the matrix converter with the main transformer, and a second power line connecting the electric power system with the main transformer,
wherein the main transformer includes a first coil connected with the first power line, a second coil connected with the second power line, and a third coil wound so as to surround a magnetic flux passing through the first coil and the second coil, and
wherein the inductor for phase adjustment is bridged between the third coil and the neutral point.

5. The power generating device of claim 1, further comprising a sub-transformer that intervenes between the inductor for phase adjustment and the power transmission path.

6. The power generating device of claim 1, wherein a power generation element is a wind power generator.

7. The power generating device of claim 1, further comprising a switch provided in series to the inductor for phase adjustment, between the power transmission path and the neutral point, and for switching a path for phase adjustment including the inductor for phase adjustment between a conducting state and a cut-off state.

8. A control device for controlling a power generating device, the power generating device comprising:
a matrix converter device;
a power transmission path for transmitting electric power between the matrix converter device and an electric power system;
at least one inductor for phase adjustment, bridged between the power transmission path and a neutral point; and
a switch provided in series to the inductor for phase adjustment, between the power transmission path and the neutral point, and for switching a path for phase adjustment including the inductor for phase adjustment between a conducting state and a cut-off state,
the control device comprising:
a power generation controlling module for controlling the matrix converter device to perform power conversion between a power generation element and the electric power system; and
a phase adjustment switching module for controlling the switch to change the path for phase adjustment into the cut-off state in response to an increase in power generation, and to change the path for phase adjustment into the conducting state in response to a decrease in the power generation.

9. A method of controlling a power generating device, the power generating device comprising:
a matrix converter device;
a power transmission path for transmitting electric power between the matrix converter device and an electric power system;
at least one inductor for phase adjustment, bridged between the power transmission path and a neutral point; and
a switch provided in series to the inductor for phase adjustment, between the power transmission path and the neutral point, and for switching a path for phase adjustment including the inductor for phase adjustment between a conducting state and a cut-off state,
the method comprising:
controlling the matrix converter device to perform power conversion between a power generation element and the electric power system; and
controlling the switch to change the path for phase adjustment into the cut-off state in response to an increase in power generation, and to change the path for phase adjustment into the conducting state in response to a decrease in the power generation.

10. A power generation system, comprising:
a matrix converter device;
an inductor for phase adjustment, bridged between a power transmission path connecting the matrix converter device with an electric power system, and a neutral point;
a switch provided in series to the inductor for phase adjustment, between the power transmission path and the neutral point, and for switching a path for phase adjustment including the inductor for phase adjustment between a conducting state and a cut-off state;
a power generation controlling module for controlling the matrix converter device to perform power conversion between a power generation element and the electric power system; and
a phase adjustment switching module for controlling the switch to change the path for phase adjustment into the cut-off state in response to an increase in power generation, and to change the path for phase adjustment into the conducting state in response to a decrease in the power generation.

* * * * *